US008021476B2

(12) United States Patent
Roman Aleman et al.

(10) Patent No.: US 8,021,476 B2
(45) Date of Patent: Sep. 20, 2011

(54) GYPSUM MORTAR WITH ADDED EXPANDED VERMICULITE AND METHOD FOR OBTAINING SAME

(75) Inventors: Barbara Roman Aleman, Elche (ES); Pilar Torres Zacarias, Elche (ES)

(73) Assignee: Fire Test, S.L. (ES)

( * ) Notice: Subject to any disclaimer, the term of this patent is extended or adjusted under 35 U.S.C. 154(b) by 0 days.

(21) Appl. No.: 12/935,623

(22) PCT Filed: Mar. 13, 2009

(86) PCT No.: PCT/ES2009/000148
§ 371 (c)(1),
(2), (4) Date: Sep. 30, 2010

(87) PCT Pub. No.: WO2009/121984
PCT Pub. Date: Oct. 8, 2009

(65) Prior Publication Data
US 2011/0024702 A1      Feb. 3, 2011

(30) Foreign Application Priority Data
Mar. 31, 2008 (ES) .................................. 200800891

(51) Int. Cl.
C04B 22/14 (2006.01)
C04B 20/06 (2006.01)
C04B 38/08 (2006.01)
C09K 21/02 (2006.01)
E04B 1/74 (2006.01)

(52) U.S. Cl. ........ 106/680; 106/672; 106/605; 106/611; 106/716; 106/728; 106/732; 106/735; 252/602; 252/606; 252/62; 252/378 R

(58) Field of Classification Search ................ 106/605, 106/608, 611, 716, 728, 732, 735, 672, 680; 252/602, 606, 62, 378 R
See application file for complete search history.

(56) References Cited

U.S. PATENT DOCUMENTS

| 1,980,889 | A | * | 11/1934 | Thomson | 252/62 |
|---|---|---|---|---|---|
| 2,463,927 | A | * | 3/1949 | Watts | 106/409 |
| 2,921,862 | A | * | 1/1960 | Sucetti | 106/658 |
| 2,980,548 | A | * | 4/1961 | Hampton | 106/675 |
| 3,153,596 | A | * | 10/1964 | Tallentire et al. | 106/780 |
| 3,305,518 | A | * | 2/1967 | Jakacki et al. | 524/423 |
| 3,502,490 | A | * | 3/1970 | Ware | 524/5 |
| 3,519,450 | A | * | 7/1970 | Polis | 106/646 |
| 3,827,895 | A | | 8/1974 | Copeland | |
| 4,190,547 | A | * | 2/1980 | Mahnke et al. | 252/62 |
| 5,034,160 | A | * | 7/1991 | Kindt et al. | 252/604 |
| 6,290,769 | B1 | * | 9/2001 | Carkner | 106/675 |
| 2004/0241270 | A1 | * | 12/2004 | Moyes et al. | 425/360 |
| 2005/0241541 | A1 | * | 11/2005 | Hohn et al. | 106/805 |

FOREIGN PATENT DOCUMENTS

| ES | 513917 | 6/1982 |
|---|---|---|
| ES | 2103417 | 8/1994 |
| ES | 2129164 | 3/1997 |
| ES | 2169605 | 3/2001 |
| ES | 2233197 | 6/2005 |
| GB | 1258054 | 12/1971 |

* cited by examiner

*Primary Examiner* — Joseph D Anthony
(74) *Attorney, Agent, or Firm* — Sanchelima & Associates, P.A.

(57) ABSTRACT

The invention relates to gypsum mortar with expanded vermiculite added with citric acid and tartaric acid and to the method for obtaining same, containing the following elements in the following proportions: between 40% and 70% calcium sulphate; between 40% and 70% laminated expanded vermiculite; between 0.05% and 0.3% citric acid; between 0.05% and 1% tartaric acid; between 0.01% and 0.5% sodium or potassium citrate; and water q.s.p. 1000 ml, in which, for surface coating, the added vermiculite is obtained following treatment in a vertical furnace, which provides improved grain size and sheets of exfoliated vermiculite without water or air, and the mortar is provided with citric acid and tartaric acid, copper sulphate and sodium or potassium scitrate, with the water being added before the mixture is produced.

3 Claims, No Drawings

GYPSUM MORTAR WITH ADDED EXPANDED VERMICULITE AND METHOD FOR OBTAINING SAME

BACKGROUND OF THE INVENTION

1. Field of the Invention

The invention refers, as set out in the description of this report, to a gypsum mortar with expanded vermiculite and enhanced with tartaric acid, citric acid, copper sulphate and potassium or sodium citrate aimed for construction, and the procedure to obtain this.

More specifically, the purpose of the invention consists of a modified calcium sulphate mortar which presents the special feature of incorporating expanded vermiculite achieved in a completely different way to those on the market. When we incorporate the calcium sulphate and water and enhance the mixture with tartaric acid, citric acid, copper sulphate and potassium or sodium citrate we obtain a mortar specially designed for fire-resistant applications and for thermal and acoustic insulations; these have the special feature of some excellent mechanical properties which makes it unnecessary to subsequently process finishings with sheets together with the corresponding sealing of joints and application of a metallic periphery. Given its excellent properties, this is also applicable to the manufacture of sheets for coating by a plaster cast system; these are either smooth or with decorative motifs.

The field of application of this invention is framed as gypsum mortar in the materials sector for coating of surfaces, more specifically within passive fire protection systems; it is also classified under acoustic and thermal insulations and decorative coatings.

2. Description of the Related Art

As is known, very different mortars of all kinds of vermiculite are reputed in the sector. The main shortcoming of these mortars, however, is the lack of mechanical resistance for which reason they tend to deteriorate much more because of friction and require subsequent finishings with fire-resistant covering panels. They will also need periodic maintenance, which corrects imperfections which occur in the mortar over time. As for acoustic or thermal insulations, these vermiculite mortars also have to be accompanied by rock wool or similar finishings or insulating sheets. In addition, all these kinds of finishings require performing additional work such as sealing joints, installing a metallic periphery, etc; it is therefore desirable to have a mortar which complies with all the functions mentioned in one sole direct application without the need for subsequent processing.

Vermiculite mortars to date incorporate expanded vermiculite by means of the simple process of heating the mineral in a furnace up to 870° C.; at this temperature the material laminates and expands up to 20 times its volume as the water in the mineral evaporates and this turns into bellows with sheets which produce brownish-grey highlights. The sheets formed act as tiny "mirrors" which reflect both thermal radiation and sound waves, which gives the mortar its insulating and fire-resistant properties. In the processes known to date, the crude vermiculite is placed inside furnaces by means of a horizontal conveyor belt; four different kinds of expanded vermiculite come out with different grain size and certain physical properties. By means of the new system proposed by the inventor, the process is performed by means of a furnace which transports the vermiculite vertically to perform the process in a similar way as is traditionally carried out with perlite. By means of this vertical process we obtain more vermiculite than by the traditional method; this new vermiculite is what gives the mortar the characteristics indicated in this report.

Another special feature presented by the mortar is that, unlike traditional mortars, the enhancer is not included in the dry mass but rather the water has to be enhanced before adding this to the mixture of sulphate and vermiculite.

The use of enhancers comprised of various products which make up this mortar's enhancer is also known; for example the citric acid and tartaric acid widely used to manufacture traditional enhancers. However, the proportions used in this mortar together with the use of substances not used in reputed enhancers give the resulting mortar better adherence, malleability, and control of hardening. We are aware of some documents, which incorporate the use of citric or tartaric acid such as patent ES 2233197 relating to an enhancer for gypsum mortar. However, as any expert on the matter can understand, this is incorporated in different proportions and uses other substances as an enhancer for gypsum mortars and aimed at applications different to those of the invention at issue here.

We should also mention the following as documents of interest related to this invention:

Patent ES 2169605, referring to gypsum mortar whose composition includes citric acid, citrates, tartaric acid or tartrates.

Patent ES 2103417, relating to a dry mortar mixture to be enhanced with gypsum mortar and limestone.

Patent ES 2129164 on a dry mortar for coating made of gypsum mortar or baked gypsum mortar based on a granulate of impregnated cellular concrete.

Patent ES 513917 dealing with a procedure to prepare a fire-resistant mortar comprised of semi-hydrated calcium sulphate in the form of gypsum mortar.

Patent No. 3827895 referring to a composition to be used in construction containing 15% to 20% of gypsum mortar.

Patent GB 1258054 relating to some concrete production improvements including gypsum mortar in its composition.

However, although the aforementioned documents refer to mortars for construction whose compositions include some of the components of the invention proposed, none of them include all of these nor do they apply a similar procedure; it can therefore be pointed out that we know of no other invention, which presents some characteristics similar to those of the invention mentioned here.

Other documents describing the closest subject matter provide for a number of more or less complicated features that fail to solve the problem in an efficient and economical way. None of these patents suggest the novel features of the present invention.

DETAILED DESCRIPTION OF THE EMBODIMENTS OF THE INVENTION

The mortar proposed by the invention is strictly configured as an obvious novelty within its field of application as it uses expanded vermiculite with a completely new expansion system unlike those existing on the market, consisting of performing the process in a vertical furnace which leads to a new kind of vermiculite. In this way, by mixing the laminated vermiculite with the calcium sulphate (gypsum mortar) and enhancing the mixture with the enhancer citric acid, tartaric acid, copper sulphate and potassium or sodium citrate we obtain a very uniform mixture which achieves at least 60% Shore C hardness. This mortar is compliant with all the regulations required of these kinds of materials and has been approved in accredited laboratories for this kind of certification.

The resulting material is a mortar, which is suitable to be applied with any of the existing traditional systems, both manually and with an applicator machine; no special qualification is required on the part of the employee who handles it.

Because of the resulting efficacy of the mortar obtained, we can provide the national and international market with some very advantageous products given that all the components exist in nature in their natural state and are not toxic; they are fully ecological and in addition imply saving time and costs by reducing the work necessary to coat a surface and give it the characteristics this mortar provides. This represents a step forward regarding what we already work with.

The components of this gypsum mortar are, as indicated previously, the calcium sulphate (gypsum mortar), the thin dry laminated vermiculite and water enhanced with citric acid, tartaric acid, copper sulphate and potassium or sodium sulphate.

Vermiculite is a mineral from the mica family basically comprised of aluminium and iron silicates. Its natural form is a brownish-grey colour mica with a laminar structure; accumulated water is present between these laminas. Its main characteristic is that by heating it above 870° C., its exfoliation capability leads to its volume increasing eight to twenty times its original size; this vermiculite is used in a less dense and dry form to manufacture mortar. This vermiculite is a very low density, very porous material with excellent insulating properties. According to the process mentioned previously, the new kind of vermiculite added to this mortar gives it some features of resistance, lightness and insulation, which significantly improve current characteristics.

The gypsum mortar is obtained from hydrated calcium sulphate, a material, which is found in abundance in nature; its use is ecological given that it is simple to dispose of its residues. It is also a hygrometric regulator as its capability to absorb and expel water vapour leads it to behave as a regulator of environmental humidity in closed spaces. It also acts as an excellent thermal and acoustic insulator giving partition walls superior insulating capability and to a large extent reducing echoes and reverberation which people find uncomfortable. Finally, we would like to point out that the gypsum mortar also provides effective fire protection given the large amount of water contained in the hydrated gypsum mortar.

The citric and tartaric acid, the copper sulphate and potassium, or sodium citrate are completely natural substances and appear in a variety of aspects and configurations in nature. They are obtained by means of very simple processes known since time immemorial. The function of the first two substances in the mortar is to control the hardening of the gypsum mortar. The copper sulphate gives the mortar some excellent adherence properties to the facing on which it is applied. Finally, the potassium or sodium citrate gives the mortar mass certain malleability characteristics, which facilitate handling and application.

The composition of the mortar proposed by the invention includes the following elements and proportions:

| Calcium sulphate | 40% to 70% |
|---|---|
| Laminated expanded vermiculite | 40% to 70% |
| Citric acid | 0.05% to 0.3% |
| Tartaric acid | 0.05% to 1% |
| Copper sulphate | 0.01% to 0.5% |
| Potassium or sodium citrate | 0.01% to 0.5% |
| Water | q.s.p. 1000 |

As is logical, based on need for application whether this is for fire resistance, thermal insulation or soundproofing, proportions will be modified within the range indicated; for example, there is a higher amount of vermiculite in mortars for fire resistance or thermal insulation applications and more calcium sulphate in soundproofing applications.

The main properties and characteristics of the new mortar are:

Lightness. The apparent density of the mortar varies between 550 and 750 Kg/m$^3$ based on grain size.

Low thermal conductivity. Its capacity for thermal insulation is such that in tests performed on a 9 cm hollow brick wall coated with an 8 cm layer of this material, when a thermal variation was applied—1200° C. initially and −200° C. subsequently—upon completion of the test the temperature variation on the unexposed face did not exceed 60° C.; this was classified as E1240. In addition, the required thicknesses of this material to obtain a certain level of protection is much less than with currently reputed mortars.

Dosification. Traditional mortars are usually mixed as a proportion of ½ litre of water for 1 kg of dry mortar. This mortar proposed requires a dosification of approximately 500 g for 1 litre of water. In this way we can facilitate transport of the material to its place of application.

Superb grain size. This is due to the small laminas of expanded vermiculite which form a variety of screens which reflect and disperse the heat conveyed by radiation, turning this material into a wonderful refractory coating.

Acoustic insulation. Since the sound waves affect the small multidirectional laminas of the expanded vermiculite, these are reflected in a variety of directions or absorbed by the microscopic structure of air bubbles from the mineral. Thanks to this, the mortar, which incorporates the vermiculite turns into an excellent acoustic insulator in a broad range of frequencies.

Fire resistance. The mortar's melting point is 1370° C. and the softening temperature is 1250° C. This is therefore a fireproof composite, which is chemically very stable at high temperatures, which turns it into an ideal material for fire protection.

Non-transferability. The mortar reported is not sensitive to atmospheric agents and passing of time. It is stable, chemically neutral (pH=7.2) and inert; it is not hygroscopic and is sterile for which reason it does not lead to any problems of plagues or diseases. When it becomes wet, it takes approximately 1 day to dry which is an improved drying time for traditional mortars, which usually take between 3 days and one week to dry.

Other advantages of the mortar would be the malleability of the mass and its correct adherence to the support in addition to its excellent mechanical properties mentioned above. All this enables direct finishings with the mortar without finishings of panels or installation of a metallic periphery. Maintenance of this mortar is virtually zero and it does not deteriorate with time.

Finally, we point out that the invention's mortar also confers environmental advantages as, due to its natural and biodegradable composition, it remains unaltered.

This invention is revealed by means of the following example which in no way aims to limit its scope:

There is a bag of dry mixture with a composition of 50% calcium sulphate and 50% expanded vermiculite. This bag of mixture will have an approximate weight of 500 g which will be subsequently added to 1 litre of water enhanced with a previously prepared mixture of citric and tartaric acid, copper sulphate and potassium citrate which will give the resulting mortar a setting time of 30 minutes; once this time has passed, the hardening of the mortar will shoot up and be completed in less than 15 minutes. This mixture is especially appropriate for coatings in interiors with the purpose of thermally insulating a building.

Now that the nature of this invention has been sufficiently reported in addition to the way to put it into practice, it is not considered necessary to broaden its explanation so that any expert in the subject can understand its scope and the resulting advantages. It is noted that it may be brought into practice in other forms which differ from that indicated as an example and which will also achieve the protection obtained as long as its fundamental principle is not altered or modified.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. Gypsum mortar for the manufacture of sheets for coatings with a plaster cast system with expanded vermiculite and enhanced with citric acid and tartaric acid especially used for fire-resistant applications and for thermal and acoustic insulation by means of manual application or by an applicator machine consisting essentially of:
   A) from 40% to 70% of calcium sulphate by weight;
   B) from 40% to 70% of laminated expanded vermiculite by weight;
   C) from 0.05% to 0.3% of citric acid by weight;
   D) from 0.05% to 1% of tartaric acid by weight;
   E) from 0.01% to 0.5% of copper sulphate by weight;
   F) from 0.01% to 0.5% of potassium or sodium citrate by weight; and
   G) a sufficient amount of water to complete 1000 ml, depending on the use of the proportion based on the intended use in each case.

2. Procedure to obtain a gypsum mortar with expanded vermiculite enhanced with citric and tartaric acid according to claim 1, characterized by the fact that for coating of surfaces, the vermiculite added is the result of processing in a vertical furnace which leads to improved grain size and some exfoliated vermiculite laminas which do not contain either water or air.

3. Procedure to obtain a gypsum mortar with vermiculite and enhanced with citric acid and tartaric acid according to claim 2, characterized by the fact that, for the coating of surfaces and with the purpose of facilitating its application and improving its mechanical characteristics, the mortar is enhanced with citric acid and tartaric acid, copper sulphate and potassium or sodium citrate; the water is added before the mixture is produced.

* * * * *